E. E. GOOD.
MILKING APPARATUS.
APPLICATION FILED AUG. 27, 1915.

1,228,314.

Patented May 29, 1917.
5 SHEETS—SHEET 1.

Witnesses
Eeva E. König
H. D. Kilgore

Inventor
E. E. Good
By his Attorneys

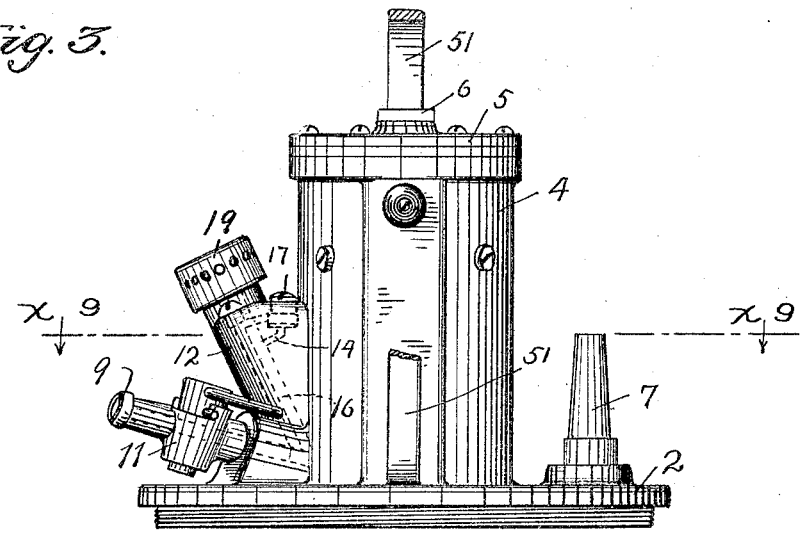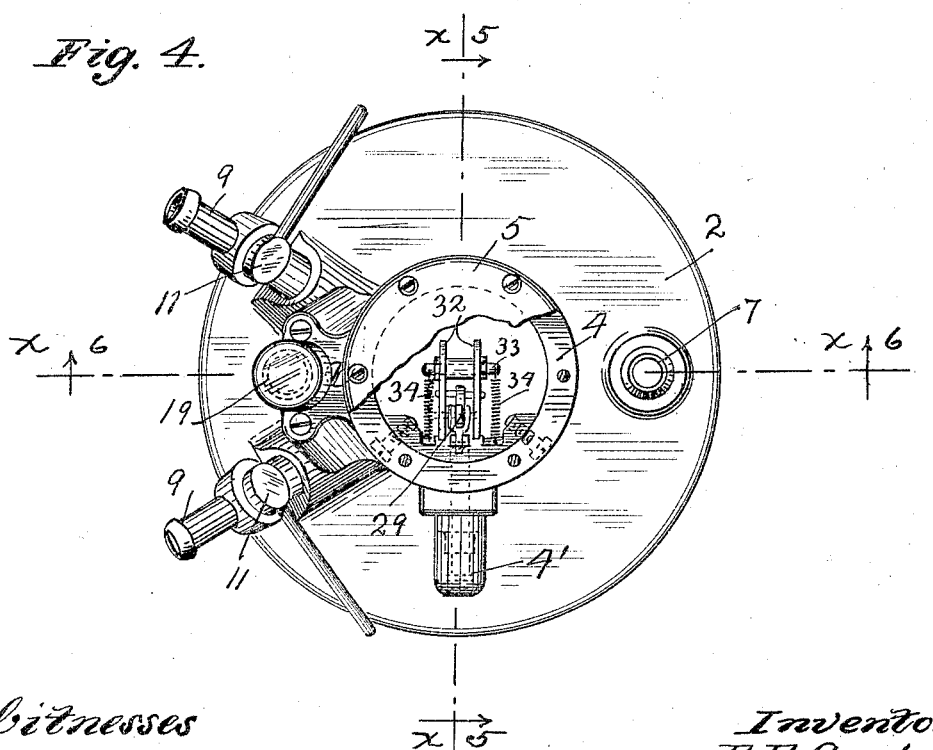

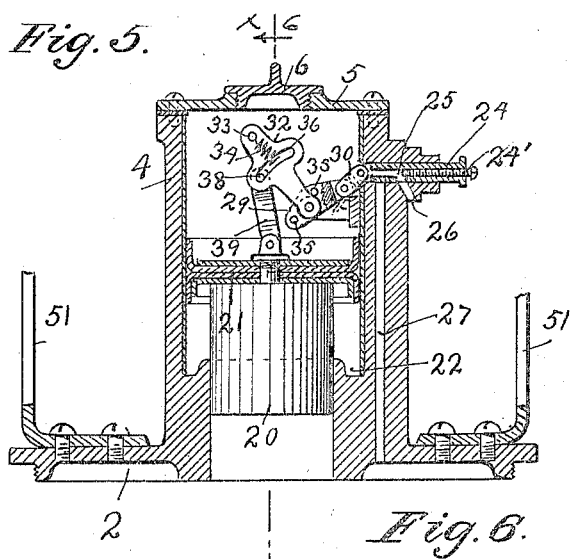

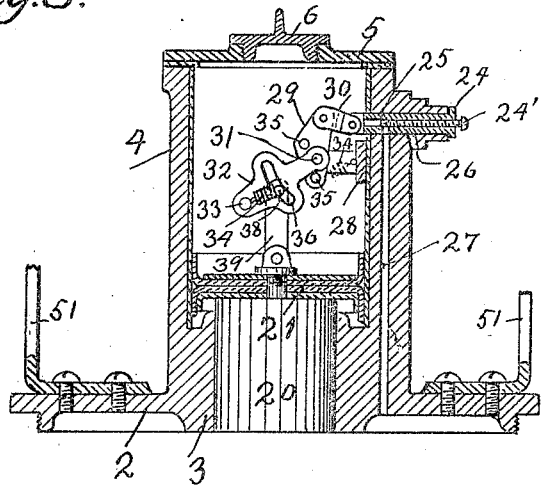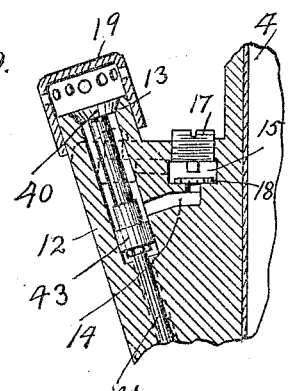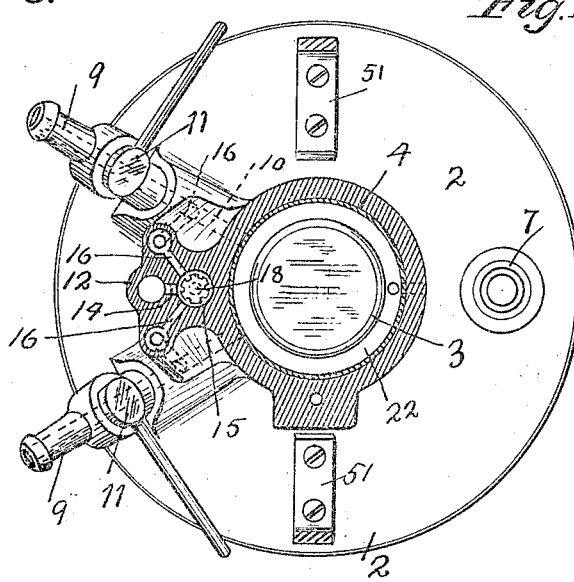

UNITED STATES PATENT OFFICE.

EZRA E. GOOD, OF MINNEAPOLIS, MINNESOTA.

MILKING APPARATUS.

1,228,314.   Specification of Letters Patent.   Patented May 29, 1917.

Application filed August 27, 1915.   Serial No. 47,569.

*To all whom it may concern:*

Be it known that I, EZRA E. GOOD, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

My present invention has for its object to provide an improved milking apparatus and relates particularly to that type of milking apparatus wherein a constant, or substantially constant, partial vacuum is maintained in a milk can or receptacle, and the pressure pulsations in the milk tube are produced without materially affecting the milk can pressure.

To the above ends, generally stated, the invention consists of the novel devices and combinations of devices hereinafter described and defined in the claims.

In the accompanying drawings which illustrate the invention, like characters indicate like parts throughout the several views.

Referring to the drawings:

Fig. 3 is a side elevation of the parts shown in Fig. 2;

Fig. 4 is a plan view with some parts broken away showing substantially the same mechanism as shown in Fig. 3;

Fig. 5 is a vertical section taken on the line $x^5$ $x^5$ of Fig. 4;

Fig. 6 is a vertical section taken on the line $x^6$ $x^6$ of Fig. 4;

Fig. 7 is a vertical section taken on the same line as Fig. 6, but illustrating different positions of certain of the parts;

Fig. 8 is a sectional view taken on the same line as Fig. 5, but illustrating different positions of the parts;

Fig. 9 is a horizontal section taken approximately on the line $x^9$ $x^9$ of Fig. 3;

Fig. 10 is a fragmentary section taken on the same line as Fig. 6;

Fig. 11 is a detail in plan showing a check valve of the mechanism best illustrated in Figs. 9 and 10;

Figure 1:
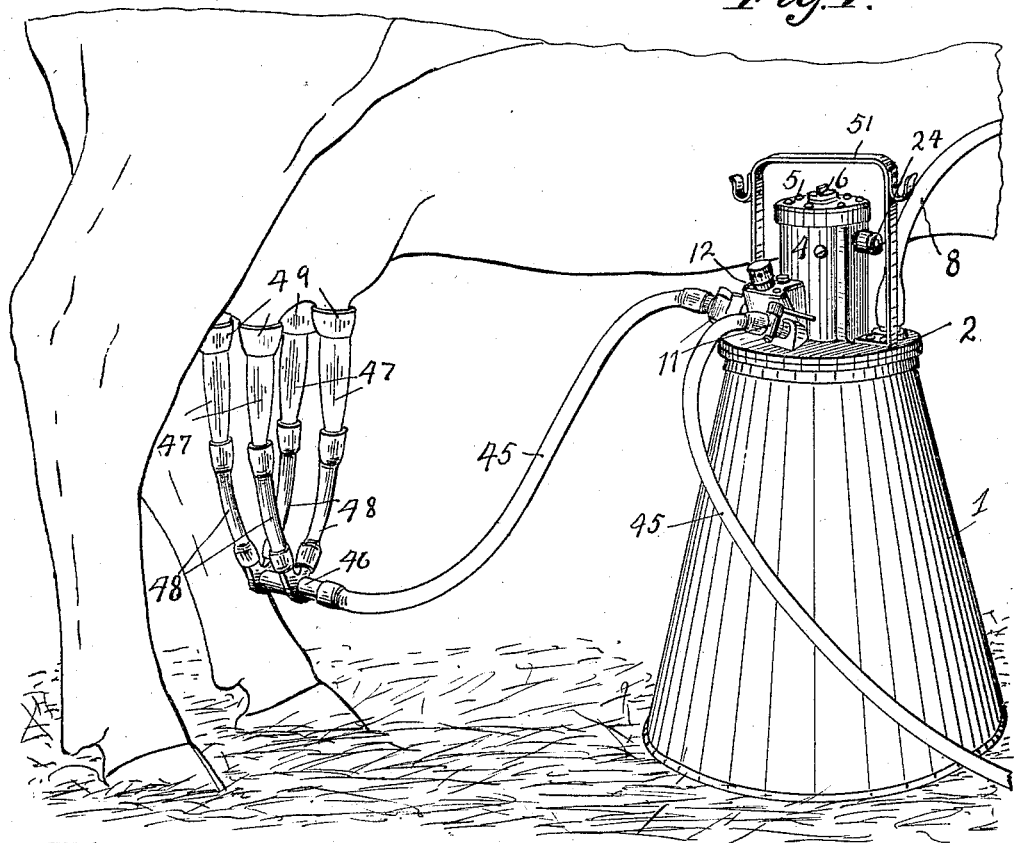
Figure 1 is a perspective view showing the improved milking apparatus in use.
Figure 2:
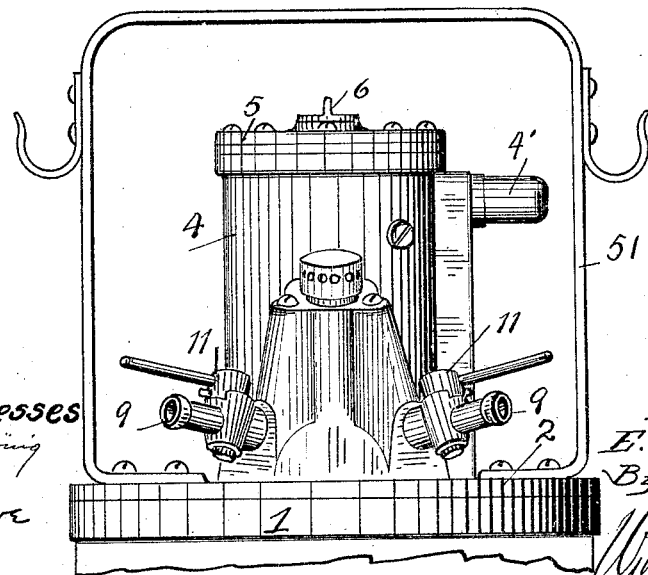
Fig. 2 is a front elevation of the mechanism which is applied on the milk can.
Figure 12:
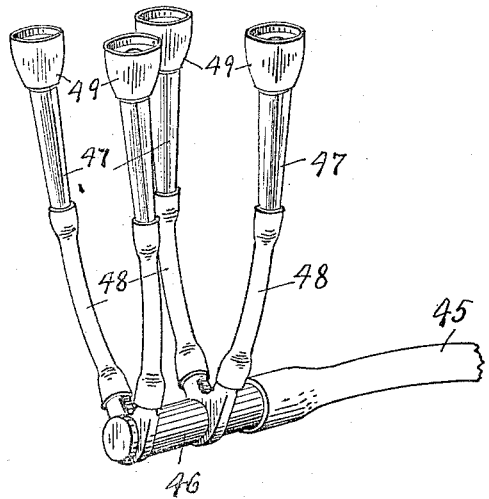
Fig. 12 is a perspective view showing one of the groups of teat cups.
Figure 13:
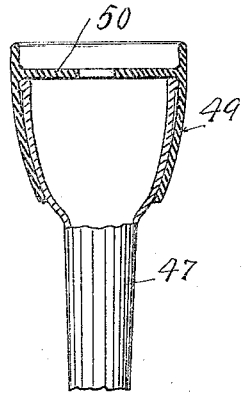
Fig. 13 shows one of the teat cups partly in section and partly in elevation.

The milk can, or receptacle may be of any suitable construction, and, in the drawings, is indicated by the numeral 1. Detachably seated on the rim thereof, with an air tight joint, preferably through the intervention of a suitable gasket, is a head 2 in the form of a casting having integral therewith, a differential cylinder 3—4. The lower extremity of the smaller cylinder 3 is open to the milk can while the upper end of the large cylinder 4 is closed by a suitable detachable head 5 shown as provided with a detachable airtight central plug 6.

The head 2 has a nipple 7 that opens therethrough into the can, and to which one end of an air suction tube 8 is attached. This air suction tube 8 will be connected to a vacuum pump or means for producing partial vacuum or suction, preferably through a vacuum tank, not shown. The milking apparatus illustrated is designed for the milking of two cows at the same time, and hence, the head 1 is provided with two milk delivery nipples 9 that terminate in ports 10 located in the intermediate portion of the wall of the smaller cylinder 3. Valves 11, which must be opened when the apparatus is in operation, are applied in the said nipples 9. Between the nipples 9, the head 1 is further provided with a sleeve-like valve casing 12 having at its outer extremity a valve seat 13. The lower portion of this valve sleeve 12 is connected by a small air duct 14, (see Figs. 9 and 10), and a small air chamber 15, which, in turn, is connected by branch air ducts 16, to the milk supply nipples 9, at points outward of their delivery ports 10. The top of the chamber 15 is shown as closed by a plug 17; and within the said chamber is a flat gravity-seated check valve 18 that normally closes the air duct 14 against the passage of air outward from the nipples 9, but opens readily to permit a flow of air from the atmosphere, through the sleeve 12, and into the said nipples 9 at the proper times. The sleeve 12 is shown as provided with a perforated protecting cap 19.

Working within the differential cylinder 3—4, is a differential piston 20—21. The smaller piston 21 works in the smaller cylinder 3 with a very close fit, and the larger piston 21 works in the larger cylinder 4, and, preferably, is of the type wherein self-seating flexible disks have flanged edges for engagement with the interior of the said cylinder.

The lower extremity of the cylinder 4, at each junction of the upper extremity of the cylinder 3, terminates in an annular channel 22 that is connected to the atmosphere by an air duct 23. This air duct 23 permits atmospheric pressure to always be maintained in the lower extremity of the said cylinder 4, and furthermore, affords an oil discharge passage for oil which may accumulate in the channel 22.

Mounted to reciprocate radially in a bore extended through the wall of the cylinder 4 and through a boss on the exterior of the same is a so-called reverse valve 24, preferably of tubular form, and having a lateral port 25 and a threaded choke plug 24', by means of which latter, the area of said port may be varied. Under movements of said valve 24, each port 25 is adapted to alternately open the upper extremities of air ducts 26 and 27, the former of which, leads to the atmosphere, and the latter of which leads to the upper portion of the milk can. The inner extremity of the bore or axial passage of the said valve 24 is open.

The numeral 28 indicates a small bearing bracket which is rigidly secured to the interior of the cylinder 4 above the highest position of the piston 21, and to this bracket, a rocker 29 is intermediately pivoted. The upper end of this rocker is connected by a short link 30 to the inner end of the valve 24. The said rocker 29 is thus pivoted to the bracket 28 by a pivot pin 31, which affords a pivotal support also for a so-called accelerator lever 32, which lever, as shown, is made in two laterally spaced parts connected at their free ends by spacing pin 33, to the projecting end of which, the upper ends of coiled accelerator springs 34 are attached. The lower or other ends of the said accelerator springs 34 are anchored to the bracket 28 (see particularly Figs. 4 and 8).

The rocker 29 has laterally projecting pins or studs 35, with which the accelerator lever 32 is engageable; but these pins are so spaced that the said accelerator lever is capable of considerable movement between them, all as will hereinafter more clearly appear. The intermediate portions of the laterally spaced members of the accelerator lever 32 are formed with segmental slots 36 in which works the end of a transversely projecting pin 38 on the upper end of a link 39, the lower end of which is pivotally connected to the differential piston 20—21.

Working in the valve sleeve or casing 12 is a so-called relief valve 40, the head of which normally engages the valve seat 13 and closes the passage through the said valve casing. The stem 41 of this valve 40 is extended downward and projects into a cavity 42 formed in the bottom of the head 2. Within the valve casing 12, the said valve stem 41 is provided with a piston-like collar 43 that always stands below the adjacent extremity of the port 14, but prevents the escape of air downward around the valve stem and into the milk can. This check valve is normally closed by gravity, and also by suction, or partial vacuum within the can. The lower end of the valve stem 41 is adapted to be engaged by a small releasing lever 44 that normally projects into the path of movement of the small piston 20, but stands in a position slightly below the ports 10 of the milk delivery nipples 9. Here this important fact may be noted, to-wit, that the said nipples 9 are obliquely disposed on such lines that the milk discharged into the can under high velocity through a small port 10, will not strike against the walls of the small cylinder 3, but will be projected below the same and either against one side or to the bottom of the milk can. This prevents the milk from running on the bottom of the head 2 to the vicinity of the lower extremity of the suction nipple 7, and hence, prevents the milk from being drawn out through the air suction tube. In previously constructed apparatus, much trouble has been caused by milk being drawn from the can through the air suction tube and into the vacuum tank of the vacuum system. This feature is overcome by the arrangement of the milk delivery nipples, as above described.

To each milk delivery nipple 9, one end of a flexible milk delivery tube 45 is attached.

To the free end of each milk tube 45 is attached a hollow nipple coupling head 46 having four tubular branches to which teat cups 47 are connected, by flexible branch tubes 48. The ends of these teat cups 47 are bell shaped, and onto each is telescoped a soft rubber cap 49 having slightly below its upper edge, a centrally perforated rubber pliable diaphragm 50 formed integral therewith. The walls of the cap 49 are so tightly contracted around the bells of the teat cups that they will not accidentally be displaced. In applying the teat cups to the cow's teats, the teats are forced downward through the perforated diaphragms 50, and the latter will be bent down around the teats, and will thereby form soft and pliable, but air tight joints with the nipples.

As shown, the head or can cover 2 is provided with a rigidly secured rectangular bail 51. 4' indicates a movable cap adapted to be applied to protect the reverse valve 24.

*Operation.*

The operation of the improved milking apparatus is substantially as follows:

As illustrated, but two cows can be milked at one time and the milk from both cows will be delivered into the same can, but as is obvious, a can may have more than two milk supply tubes, groups of teat cups and coöperating devices, so as to thereby provide for the milking of more than two cows at one time.

Fig. 1 shows the position of the milking device with one group of teat cups applied to a cow. When the apparatus is to be used to milk but one cow, the nipple 9 to the other milk tube should have its valve 11 closed. Figs. 5 and 6 illustrate what may be assumed to be the starting position of the differential piston and coöperating devices. At this time, the air, under atmospheric pressure, is admitted to the upper portion of the cylinder 4, through the air duct 26, port 25 and axial passage of the reverse valve 24, and the air duct 27 is closed by said valve 24, so that the suction or partial vacuum from within the milk can does not act upon the large portion 21 of the differential piston, but does act directly upon the small section 20 of the said differential piston. In the said position of the parts in Fig. 5, atmospheric pressure tends to force the reverse valve 24 inward, but the said valve is locked against such movement by the rocker 29 and link 30 which then act as a lock toggle and are set with the intermediate joint of the toggle slightly below a dead center. Hence, when the differential piston and the accelerator lever 32 begin their downward movement, the said reverse valve 24 will not immediately follow the same. It will, of course, be understood that while the apparatus is in operation, a partial vacuum is maintained in the milk can. At this time, the discharge ports 10 of the milk delivery nipples 9 are open, so that the partial vacuum or suction in the milk can produces a corresponding suction or partial vacuum in the milk tubes 45 and teat cups 47, thereby drawing the milk into the milk can. The partial vacuum in the milk can, acting on the small section or piston 20 of the differential piston, draws the said differential piston downward.

The initial downward movement of the said differential piston carries the so-called accelerator lever 32 with it until the accelerator springs 34 are moved past their neutral or dead central position, in respect to the pivot 31, whereupon the said springs throw the said accelerator lever ahead and downward with a rapid movement, causing the same to strike the lower stop pin 35 and thereby, with a quick hammer-like blow, oscillate the rocker 29, and through the link 30, cause the reverse valve 24 to move into a position to close the atmospheric duct 26 and bring the port 25 into registration with the duct 27, thereby connecting the milk can to the upper end of the cylinder 4 and subjecting the larger portion 21 of the differential piston to the partial vacuum or suction from the milk can. The length of the slots 36 in the accelerator lever 32 should be such as to permit the above rapid movement of the accelerator lever and valve 24 actuated thereby, without waiting for the continued downward movement of the differential piston. Under the final portion of the downward movement of the differential piston, the piston or section 20 first closes the discharge ports 10 of the milk intake nipples 9, thereby cutting off communication between the milk can and the milk delivery tubes 45, and immediately thereafter, the said piston 20 strikes the lever 44 and causes the same to open the relief valve 40. Obviously, when the relief valve 40 is open, air under atmospheric pressure will be admitted to the milk delivery tubes, and hence, to the teat cups, so that the cow's teats, for a short interval of time, will be relieved from suction. At the extreme downward movement of the differential piston, the partial vacuum or suction from the milk can, which was rendered effective in the upper end of the larger cylinder 4 at an earlier instant, will cause the return upward movement of the said differential piston, because, at such times, both the large and small ends or portions of the differential piston are subject to the milk can pressure or vacuum and the larger area will, of course, determine the direction of the movement of the said differential piston. Under initial upward movement of the differential piston, the relief valve 40 will first be closed and then the ports 10 will be opened, and furthermore, under the said movement of said piston, the pin 38, acting on the upper extremity of the slot 36 of the accelerator lever 32 will move the same to a point where the accelerator springs 34 will pass their neutral or dead center position, in respect to the pivot 31, whereupon the said springs will quickly throw the said accelerator lever against the upper pin 35 of the rocker 29, and with a hammer-like blow, instantly force the reverse valve 24 back into the said position shown in Fig. 5, which was the position assumed as the starting point in this description of operation. Obviously, the actions above described will be repeated over and over again as long as the milk can is subject to partial vacuum or suction. The speed at which the reciprocations of the differential piston take place, and, consequently, the rapidity of the pressure pulsations produced in the teat cups, may be varied by adjustments of the threaded plug or choke device 24' which regulates the opening of the port 25 of the reverse valve 24.

From the above description, it is further evident that the accelerator lever and springs operate as a full stroke device to insure full and complete movements of the reverse valve 24.

The above operations, as is evident, produce the varying pressure pulsations in the milk pipes and teat cups of the milking device while a constant or approximately constant partial vacuum is maintained in the milk can. This reduces to a minimum, the amount of air used in the milking action and makes the pulsation producing mechanism very sensitive in action. By regulation of the speed of the differential piston, a graduated milking action is made possible, and when the apparatus is properly adjusted, the milking operation may be performed as rapidly as possible without hurting the cow's teats, either temporarily or permanently.

The efficiency of this apparatus has been demonstrated in practice.

What I claim is:

1. In a milking apparatus, the combination with a closed milk receptacle, of a differential cylinder and a differential piston working therein, said cylinder having its small end in constant communication with said receptacle, a reverse valve and coöperating ports for alternately connecting the larger end of said cylinder to said milk receptacle and to the atmosphere, piston actuated connections for moving said reverse valve, a milk delivery conduit connected to said milk receptacle, and a relief valve distinct from said piston for said milk delivery conduit, controlled by movements of said differential piston.

2. In a milking apparatus, the combination with a closed milk receptacle, of a differential cylinder and a differential piston therein, said cylinder having its small end in constant communication with said milk receptacle, a reverse valve and coöperating ports for alternately connecting the larger end of said cylinder to said milk receptacle and to the atmosphere, piston controlled connections for moving said reverse valve from one position to another, a milk delivery conduit leading to said milk receptacle and arranged to be opened and closed by the small portion of said differential piston, and a normally closed relief valve distinct from said piston, located in said milk conduit and arranged to be opened by said differential piston after the same has first closed the delivery end of said milk delivery conduit, whereby pressure pulsations are produced in said milk delivery conduit without affecting the partial vacuum maintained in said milk receptacle.

3. In a milking apparatus, the combination with a closed milk receptacle in which an approximately constant partial vacuum may be maintained, of a cylinder and coöperating piston therein, said cylinder having one end in communication with said milk receptacle, a reverse valve and coöperating ports for alternately connecting the other end of said cylinder to said milk receptacle and to the atmosphere, a toggle-like connection to said reverse valve serving to temporarily lock the same in one position, and a spring-actuated accelerator actuated by said piston and operating said toggle but having a limited movement in respect thereto.

4. In a milking apparatus, the combination with a closed milk receptacle, of a cylinder and coöperating piston therein, said cylinder having one end in communication with said milk receptacle, a reverse valve and coöperating ports for alternately connecting the other end of said cylinder to said milk receptacle, and to the atmosphere, a valve connection serving to temporarily lock said reverse valve in one position, and a device operated by said piston and operating on said valve connection to move said valve into its other position and back again to lock position.

5. In a milking apparatus, the combination with a closed milk receptacle, of a cylinder and coöperating piston therein, said cylinder having one end in communication with said milk receptacle, a reverse valve and coöperating ports for alternately connecting the other end of said cylinder to said milk receptacle, and to the atmosphere, a valve connection serving to temporarily lock said reverse valve in one position, and a device operated by said piston and operating on said valve connection to move said valve into its other position and back again to lock position, a milk delivery conduit leading to said milk receptacle and arranged to be opened and closed by said piston, and a normally closed relief valve in said milk conduit arranged to be opened by said piston while said milk conduit is closed by the said piston.

6. In a milking apparatus, the combination with a closed milk receptacle in which an approximately constant partial vacuum may be maintained, of a differential cylinder and a differential piston therein, said cylinder having its small end in constant communication with said milk receptacle, a reciprocating reverse valve and coöperating ports for alternately connecting the large end of said cylinder to said milk receptacle and to the atmosphere, a toggle-like connection to said reverse valve temporarily locking the same in position to open said cylinder to the atmosphere, a spring actuated accelerator therefor having a movement in respect to said toggle connection, but operative thereon under extreme movements in both directions, and a connection between said piston and accelerator lever serving to move the same from one side to the other of a neutral position.

7. In a milking apparatus, the combination with a closed milk receptacle in which an approximately constant partial vacuum may be maintained, of a differential cylinder and a differential piston working therein, said cylinder having its small end in constant communication with said milk receptacle, a reciprocating reverse valve and coöperating ports for alternately connecting the large end of said cylinder to said milk receptacle and to the atmosphere, and piston actuated connections for moving said valve from one position to another, including a spring-pressed accelerator movable from one side to the other from a neutral position, arranged to be moved by said piston but capable of movement independent thereof, and operative with a hammer-like action on a coöperating valve actuating connection.

8. In a milking apparatus, the combination with a closed milk receptacle in which an approximately constant partial vacuum may be maintained, of a differential cylinder and a differential piston working therein, said cylinder having its small end in constant communication with said milk receptacle, a reciprocating reverse valve and coöperating ports for alternately connecting the large end of said cylinder to said milk receptacle and to the atmosphere, and piston actuated connections for moving said valve from one position to another, including a spring-pressed accelerator movable from one side to the other from a neutral position, arranged to be moved by said piston but capable of movement independent thereof, and operative with a hammer-like action on a coöperating valve actuating connection, a milk delivery conduit having a discharge port located in the wall of the small portion of said differential cylinder and arranged to be opened and closed by the small portion of said differential piston, and a normally closed relief valve in said milk conduit arranged to be opened by said piston while said milk delivery conduit is closed by said piston.

9. In a milking apparatus, the combination with a closed milk receptacle, of a differential cylinder and a differential piston working therein, said cylinder having its small end in constant communication with said receptacle, a reciprocating reverse valve with a port therein and coöperating ports for alternately connecting the larger end of said cylinder to said milk receptacle and to the atmosphere, said reverse valve having means for adjusting its port opening, and piston actuated connections for moving said reverse valve.

10. In a milking apparatus, the combination with a closed milk receptacle, of a cylinder and coöperating piston therein, said cylinder having one end in communication with said milk receptacle, a reverse valve and coöperating ports for alternately connecting the other end of said cylinder to said milk receptacle, and to the atmosphere, a valve connection serving to temporarily lock said reverse valve in one position, and a device operated by said piston and operating on said valve connection to move said valve into its other position and back again to lock position, and means for varying the conducting capacity of certain of the said ports, to thereby vary the rapidity of movement of said piston and reverse valve.

11. In a milking apparatus, the combination with a closed milk receptacle, of a differential cylinder and a differential piston working therein, said cylinder having a small end in constant communication with said milk receptacle, a reciprocating reverse valve and coöperating ports for alternately connecting the larger end of said cylinder to said milk receptacle and to the atmosphere, a toggle-acting connection serving in one position to temporarily lock said reverse valve in a position to open the larger end of said cylinder to the atmosphere, an accelerator lever having a limited movement in respect to one of said toggle members, but operative thereon under extreme movements, to move said valve from one position to another, an accelerator spring operative on said accelerator lever and movable from one side to another of a neutral position, and a connection between said accelerator lever and piston causing said piston to move said lever from one side to another of its neutral position but permitting the said lever to partake of independent movements under the action of said accelerator spring.

12. In a milking apparatus, the combination with a closed milk receptacle, of a differential cylinder and differential piston arranged in an upright position with the large end of said cylinder upward, the large portion of said cylinder terminating in an annular groove surrounding the upper extremity of the small portion of said cylinder, the said annular groove having a combined oil and air passage extending to the atmosphere, a reverse valve and coöperating ports for alternately connecting the large end of said cylinder to said milk receptacle and to the atmosphere, and piston actuated connections for moving said reverse valve from one position to another.

In testimony whereof I affix my signature in presence of two witnesses.

EZRA E. GOOD.

Witnesses:
H. D. KILGORE,
F. D. MERCHANT.